Inventors
ANDREW V. HAEFF
THURE HANLEY
By M. A. Hayes
Attorney

March 18, 1952 A. V. HAEFF ET AL 2,589,248

SIGNAL GENERATOR

Filed Jan. 11, 1946 2 SHEETS—SHEET 2

Inventors
ANDREW V. HAEFF
THURE HANLEY

By M. A. Hayes

Attorney

Patented Mar. 18, 1952 2,589,248

UNITED STATES PATENT OFFICE 2,589,248

SIGNAL GENERATOR

Andrew V. Haeff and Thure E. Hanley, Washington, D. C.

Application January 11, 1946, Serial No. 640,636

8 Claims. (Cl. 250—36)

(Granted under the act of March 3, 1883, as amended April 30, 1928; 370 O. G. 757)

This invention relates to electrical signal generators and more particularly to high frequency generators adapted to operate in a microwave region.

In the microwave regions of the frequency spectrums, oscillation generators are frequently employed in which a resonant cavity structure functions as a frequency determining element for some source of oscillatory energy, typically a velocity modulation electron tube. In such an oscillation generator, energy is supplied to the resonant cavity structure at its resonant frequency or at a frequency bearing some harmonic relationship to its resonant frequency. In the oscillator structures hitherto available, it was not possible to tune the resonant cavity to produce sustained oscillation at any particular frequency throughout a wide band of frequencies simply by the alteration of a single cavity dimension because at certain frequency points in the wide band, effects existed which prevented operation entirely or which rendered operation unsatisfactory because of low power output, for example.

Accordingly, it is an object of this invention to provide an oscillation generating system employing a cavity resonator as a frequency selective element which is tunable to any particular frequency over a wide band of frequencies without unsatisfactory operation occurring at any frequency in the band.

Another object of the present invention is to provide a cavity resonator of substantially rectangular cross section in which the width and length thereof may be simultaneously adjusted to control the resonant frequency.

Another object of the present invention is to provide a high frequency signal generator in which the amount of the output power is readily determined.

Other and further objects and features of the present invention will become apparent upon a careful consideration of the following detailed description when taken together with the accompanying drawings which illustrate a typical embodiment of the invention and the manner in which this embodiment may be considered to operate.

According to the fundamental concepts of the present invention, a velocity modulation oscillator assembly employing a rectangular wave guide resonant cavity section is rendered tunable to any particular frequency in a wide frequency range by simultaneous alteration of the length dimension and a second dimension of the resonant cavity and the potential applied to an element or elements of the velocity modulation oscillation tube. In addition, frequency and power determining means are provided by means of which accurate determination of the oscillator frequency and the relative level of the output power may be made.

Figures 1, 3:
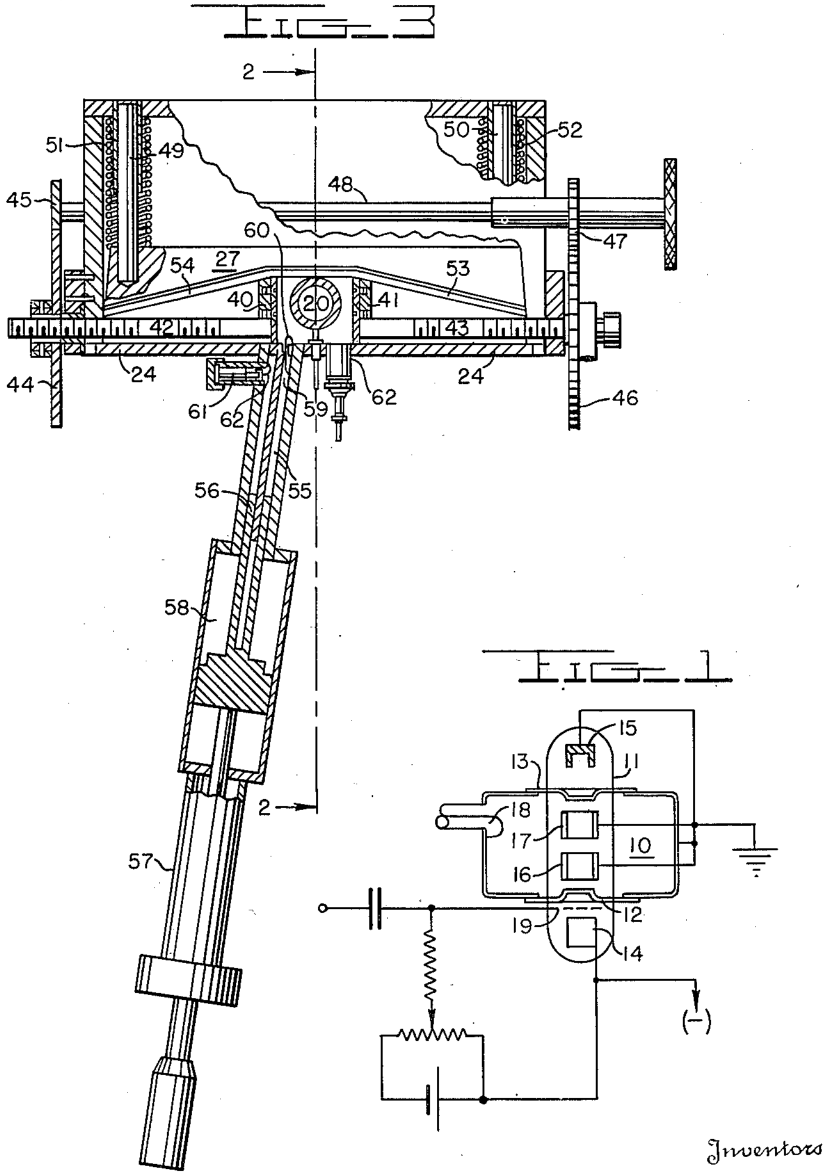
Fig. 1 is a schematic drawing of a velocity modulation oscillator employing a resonant cavity as a frequency selective element.
Fig. 3 shows a second view of the oscillator and cavity assembly in Fig. 2, partly in section, on the line 3—3 of Fig. 2.

With particular reference to Fig. 1, a schematic drawing of a resonant cavity velocity modulated high frequency signal generator constructed according to the principles of the present invention is shown. The resonant cavity 10 is formed partly within and partly without the glass envelope of the tube 11, connections between the inner and outer parts of the cavity being made through annular conductive rings 12, 13 sealed through the glass walls of the tube 11.

Electrons emitted by the cathode structure 14 travel in the direction of an electrode 15 maintained at a voltage positive with respect to the cathode structure. In their passage from the cathode to the positive electrode 15, the electrons are subjected to various fields from the cylindrical electrodes 16, 17 and the annular rings 12, 13. The combined action of these fields is to concentrate the electrons into a small diameter beam and to transfer a part of the energy of the beam to the resonant cavity. The oscillation generator functions similar to conventional velocity modulation oscillators with electron bunching taking place in the so-called "drift space" between rings 12, 13 to produce and sustain oscillation. A part of the energy generated within the oscillator is supplied to an external power consuming device by means of an output coupling arrangement and coaxial transmission line 18. The output coupling is shown as fixed in the simple illustration of Fig. 1, however the present invention provides for variable output coupling as well as frequency and power indicating apparatus not shown in Fig. 1.

Provision is further made in the oscillation generator of Fig. 1 for modulating the output signal by a beam control electrode or grid structure 19. By adjustment of the potential difference existing between element 10 and the cathode 14, the number of electrons travelling from the cathode 14 to electrode 15 may be controlled to alter the amplitude of the oscillatory field within the resonator and hence the amplitude or presence of an output signal.

The frequency of the output signal is determined primarily by the dimension of the cavity 10 and the potential difference existing between the elements 14 and 15 of the tube because either factor will alter the bunching of electrons which occurs in passage between the annular rings 12, 13.

Figure 2:
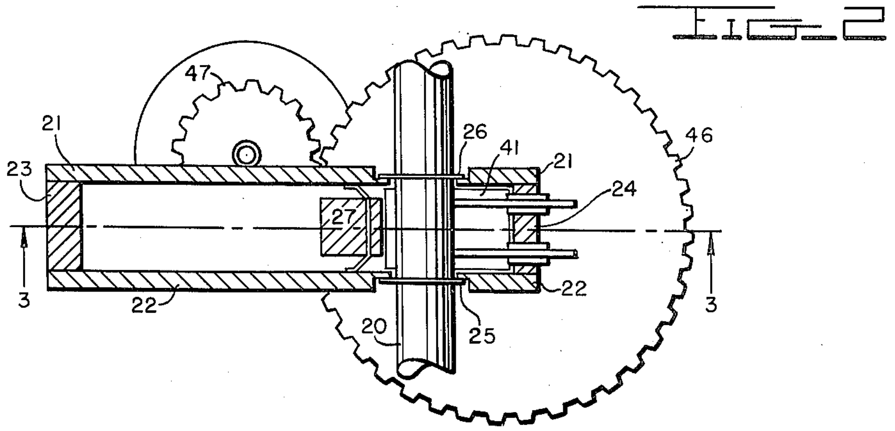
Fig. 2 shows a view partly in section of an oscillator and cavity assembly constructed according to the present invention, taken on the line 2—2 of Fig. 3.

With reference now to Fig. 2, a sectional view of a resonant cavity constructed according to the principles of the present invention is shown. The resonant structure is constructed around the cut away oscillator tube 20 and comprises an outer cavity bounded in the plane of Fig. 2 by the plates 21, 22, 23, 24 and the annular rings 25, 26 of tube 20. A portion of this outer cavity is divided off in the plane of Fig. 2 by a slidable assembly 27. The section thus bounded by plates 21, 22, 24, the annular rings 25, 26, and the slidable assembly 27 forms a variable size resonant cavity for the high frequency oscillator.

In Fig. 3, a sectional view of the oscillator assembly in the plane 3—3 as indicated in Fig. 2 is shown. The inner resonant cavity formed in the assembly of Fig. 2 is further bounded in the plane of Fig. 3 by slidable wall members 40, 41. Members 40, 41 are positionally variable and may be simultaneously moved in opposite directions, either together or apart, by means of the threaded shafts 42, 43, respectively. Shafts 42 and 43 are turned simultaneously through coupling such as gearing 44, 45, 46, 47 and a counter shaft 48. Shaft 48 may be rotated directly or indirectly through other shaft members if desired for convenience of adjustment.

As shown in Fig. 3, the lower surface of assembly 27 rests upon the upper surfaces of the slidable members 40, 41. Assembly 27 is held in this position by the guide members 49, 50 and the springs 51, 52. Assembly 27 is provided with a central portion substantially perpendicular to the slidable members 40, 41 and with two outer inclined portions 53, 54. Thus an outward motion of members 40, 41 from their position as shown in Fig. 3 will cause an upward motion of assembly 27 so that the cavity dimension between assembly 27 and the bottom plate 24 is simultaneously altered. Similarly inward motion of members 40, 41 from an outward position will cause a reduction in the cavity dimension between assembly 27 and plate 24. Thus simultaneous alteration of the length and, as shown in Fig. 3, the height of the cavity is achieved.

For the purpose of measuring the frequency of signals generated within the oscillator, a frequency sensitive device is incorporated therein. The frequency sensitive device comprises a resonant section 55 of coaxial transmission line, selectively variable in length by means of a plunger 56, the location of which within the line section may be accurately controlled by a micrometer positioning device 57. To reduce leakage of energy past the plunger 56, a second coaxial line section 58, substantially anti-resonant at the frequency of section 55 is placed serially therewith. The resonant frequency of both line sections is varied simultaneously by motion of the micrometer adjusting device 57. The coaxial line section 55 is inductively coupled to the inner resonant cavity of the oscillator by means of the loops 59 and 60 and a short section of coaxial transmission line placed between them. In operation, a condition of energy maximum will exist in the resonant section 55 when the resonant frequency of that section is equal to the frequency of the oscillations generated within the inner resonant cavity of the oscillator and is indicated by a maximum flow of current through a unilateral rectifying device 61 coupled to section 55 by means of an inductive loop 62. The unilateral rectifying device 61 may be of several types but generally a crystal device is preferred. It is thus possible to adjust the micrometer positioning device 57 for maximum rectified current flow through the unilateral device 61. Since the position of plunger 56 will of necessity be different for different signal frequencies, the micrometer mounting may be calibrated so that a rapid and convenient frequency indication is available.

Figure 4:
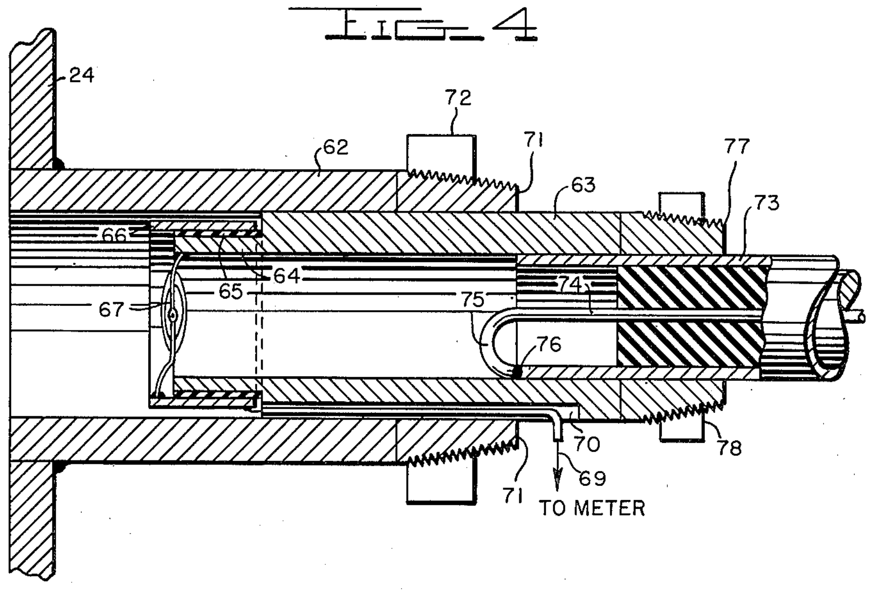
Fig. 4 is an enlarged sectional view of an output coupling assembly as shown in Fig. 3.

Radio frequency energy generated within the inner cavity of the oscillator is supplied to an external power consuming device through an output coupling apparatus an enlarged sectional view of which is shown in Fig. 4. The coupling apparatus comprises an outer conductive sleeve 62 fitted to an opening in the bottom plate 24 of the oscillator. Referring now to Fig. 4, a cylinder 63 having an inner end section 64 of reduced outer diameter is slidably mounted within sleeve 62. Surrounding the end section 64 is a collar 65 of insulating material, preferably mica. In turn surrounding collar 65 is a second collar 66 of conductive material. Connected between sleeve 63 and collar 66 is a power measuring device 67, shown in the preferred embodiment as a thermistor, by means of which the average oscillatory power level in the vicinity of the end section 64 may be determined.

The resistance of the thermistor element may be conveniently measured by means of an external ohmmeter connected thereto through an insulated lead 69 brought to collar 66 through a slot 70 in sleeve 63. Sleeve 63 may be positioned within sleeve 62 so that a reference power level is established in the vicinity of the thermistor element 67. Sleeve 63 can then be clamped in position within sleeve 62 by suitable means such as compression of a slotted end 71 of sleeve 62 with rotation of the internally threaded collar 72.

A second slidable member 73 forming a part of a coaxial transmission line is mounted within the sleeve 63. The inner conductor 74 of the coaxial line is bent to form an inductive coupling loop 75 and attached to the outer conductor 73 at point 76. Attenuation produced by the passage of energy through the cylindrical waveguide formed within the sleeve 63 will result in a gradual decrease in the energy of oscillation as it progresses through sleeve 63 toward the output coupling loop 75. Thus the position of the output pickup loop 75 may be varied within sleeve 63 to select the signal output amplitude desired. Furthermore, since the attenuation produced through sleeve 63, once determined, remains substantially constant, conductor 73 can be calibrated positionally in terms of attenuation below the reference power level established at the thermistor element 67. Conductor 73 may then be clamped in position with respect to sleeve 63 by compression of the slotted end 77 of sleeve 63 with rotation of the internally threaded collar 78.

A typical velocity modulation oscillator constructed in accordance with the concepts of the present invention had the following dimensions or elements, dimensions being in inches unless otherwise noted.

| | |
|---|---|
| Type of tube 20 employed Klystron (W. E. Co.) | 1289 CT |
| Type crystal 61 employed | 1 N 23 |
| Spacing between slidable members 40-41 (range) | 1.3–6.25 |
| Spacing between plates 21, 22 | 0.681 |
| Spacing between plate 24 and the central section of assembly 27 | 1.0–1.5 |
| Angular deviation of end sections of assembly 27 from plane of central section of assembly 27 ____degrees | 12.5 |
| Wavelength range of output signal centimeters | 3.1 |

From the foregoing discussion it is aparent that considerable modification of the features of this invention are possible and while the device herein described and the form of apparatus for the operation thereof constitutes a preferred embodiment of the invention, it is to be understood that the invention is not limited to this precise device and form of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In an oscillation generator employing a rectangular waveguide structure of which a part is employed as a frequency selective element, wall contacting members within the waveguide structure establishing the size of the frequency selective part thereof, positioning means adjusting said wall contacting members for simultaneously altering the length dimension and a second dimension of the frequency selective part of the structure to change the resonant frequency thereof, a velocity modulation electron tube supplying energy to the waveguide structure, voltage variation means adjusting the operating frequency of the electron tube, an external energy consuming device, serially connected output coupling attenuators placed between the oscillator waveguide structure and the external energy consuming device, the first of said serially arranged attenuators reducing the output power produced by the oscillation generator to a reference level, the second of said serially arranged output attenuators producing adjustable energy attenuation below said reference level, a calibration scale associated with the second attenuator for indicating attenuation below the reference power level established by the first attenuator, and frequency determining means indicating the frequency of the energy existing in the resonant cavity structure.

2. A variable coupling device for transmitting alternating electrical energy from an energy source to an energy consuming device, comprising; a first transmission section of variable length for receiving energy from the energy source and producing attenuation of the energy to an intermediate level, said first transmission section comprising a pair of concentric telescopic wave guide means, one of said wave guide means having a reduced portion, a conducting member mounted in said reduced portion and insulated from said pair of concentric telescopic wave guide means and a measuring means comprising a temperature variable resistor coupled between said one of said wave guide means and said conducting member, a second transmission section of variable length coupled to the first transmission section for producing attenuation of said energy from the first transmission section at the intermediate level to a level usable by the energy consuming device, and a calibration scale coupled with said second transmission section for indicating attenuation below the intermediate energy level.

3. A high frequency oscillation generator system, comprising; a rectangular resonant cavity structure, a velocity modulation type electron tube for supplying energy to the cavity structure, voltage variation means adjusting the operating frequency of the electron tube, an external energy consuming device, an output coupling device having two serially connected attenuators placed between the resonant cavity and the external energy consuming device, the first of said serially connected attenuators reducing the output power produced by the oscillation generator to a reference level, said first attenuation means comprising a pair of concentric telescopic wave guide means, one of said wave guide means having a reduced portion, a conducting member mounted in said reduced portion and insulated from said pair of concentric telescopic wave guide means and a measuring means comprising a temperature variable resistor coupled between the said one of said wave guide means and said conducting member, the second of said serially connected attenuators causing adjustable power reduction below said reference level, and a calibration scale associated with the second attenuator for indicating the attenuation produced by the second attenuator below the reference power level established by the first attenuator.

4. A high frequency oscillation generator system, comprising; a rectangular resonant cavity structure, a velocity modulation type electron tube supplying energy to the cavity structure, voltage variation means adjusting the operating frequency of the electron tube, an external energy consuming device, an output coupling device having two serially connected attenuator sections placed between the resonant cavity and the external energy consuming device, the first of said serially connected attenuators reducing the output power produced by the oscillation generator to a reference level, said first attenuation means comprising a pair of concentric telescopic wave guide means, one of said wave guide means having a reduced portion, a conducting member mounted in said reduced portion and insulated from said pair of concentric telescopic wave guide means and a measuring means comprising a temperature variable resistor coupled between the said one of said wave guide means and said conducting member, the second of said serially connected attenuators producing adjustable power reduction below said reference level, and a calibration scale associated with the second attenuator for indicating the attenuation produced by the second attenuator below the reference power level established by the first attenuator, and frequency determining means indicating the frequency of energy existing in the resonant cavity structure.

5. A high frequency oscillation generator system, comprising; a rectangular resonant cavity structure frequency selective device, means dimensionally altering the resonant cavity structure to adjust the resonant frequency thereof, a velocity modulation electron tube supplying energy to the resonant cavity, voltage variation means adjusting the operating frequency of the electron tube, an external energy consuming device, serially connected output coupling attenuators placed between the oscillator resonant cavity structure and the external energy consuming device, the first of said serially connected attenuators reducing the output power produced by the oscillation generator to a reference level, said first attenuation means comprising a pair of concentric telescopic wave guide means, one of said wave guide means having a reduced portion, a conducting member mounted in said reduced portion and insulated from said pair of concentric telescopic wave guide means and a measuring means comprising a temperature variable resistor coupled between the said one of said wave guide means and said conducting member, the second of said serially connected output attenuators producing adjustable energy attenuation below said reference level, a calibration scale associated with the second attenuator for indicating attenuation below the reference power level established by the first attenuator, and frequency determining means indicating the frequency of the energy existing in the resonant cavity structure.

6. A device for coupling electromagnetic energy to a load element comprising a first adjustable attenuating means energized by the energy to be coupled for establishing a predetermined energy level, said first attenuation means comprising a pair of concentric telescopic wave guide means, one of said wave guide means having a reduced portion, a conducting member mounted in said reduced portion and insulated from said pair of concentric telescopic wave guide means and a measuring means comprising a temperature variable resistor coupled between the said one of said wave guide means and said conducting member, and a second adjustable attenuating means connected between the output of said first attenuating means and said load element.

7. A device for coupling electromagnetic energy to a load element comprising a first attenuating means energized by the energy to be coupled for establishing a predetermined energy level, said first attenuation means comprising a pair of concentric telescopic wave guide means, one of said wave guide means having a reduced portion, a conducting member mounted in said reduced portion and insulated from said pair of concentric telescopic wave guide means and a measuring means comprising a temperature variable resistor coupled between the said one of said wave guide means and said conducting member, a second attenuating means connected between the output of said first attenuating means and said load element, means for varying the energy attenuation produced by said first attenuating means and means for varying the energy attenuation produced by said second attenuating means.

8. In an oscillation generator employing a rectangular waveguide structure of which a part is employed as a frequency selective element, wall contacting members within the waveguide structure establishing the size of the frequency selective part thereof, positioning means adjusting said wall contacting members for simultaneously altering the length dimension and a second dimension of the frequency selective part of the structure to change the resonant frequency thereof, a velocity modulated electron discharge tube supplying energy to the waveguide structure, voltage variation means adjusting the operating frequency of the electron tube, an external energy consuming device, serially arranged output coupling attenuators placed between the oscillator waveguide structure and the external energy consuming device, and frequency measuring means including a cavity structure coupled to the waveguide structure having a tuning member movably mounted therein for varying the resonant frequency thereof, an operating member for said tuning member extending without said cavity structure, and an anti-resonant cavity connected to said cavity structure to enclose said operating member and including a tuning member operable through said operating member to maintain an anti-resonant condition therein at all resonant frequencies of said cavity structure.

ANDREW V. HAEFF.
THURE E. HANLEY.

REFERENCES CITED

The following references are of record in the file of this patent:

UNITED STATES PATENTS

| Number | Name | Date |
|---|---|---|
| 2,204,179 | George | June 11, 1940 |
| 2,296,678 | Linder | Sept. 22, 1942 |
| 2,306,282 | Samuel | Dec. 22, 1942 |
| 2,373,233 | Dow | Apr. 10, 1945 |
| 2,376,785 | Krasik | May 22, 1945 |
| 2,397,411 | Dow | Mar. 26, 1946 |
| 2,404,279 | Dow | July 16, 1946 |
| 2,409 321 | Stephan | Oct. 15, 1946 |
| 2,410,109 | Schelleng | Oct. 29, 1946 |
| 2,411,553 | Ramo | Nov. 26, 1946 |
| 2,412,055 | Meahl | Dec. 3, 1946 |
| 2,419,984 | Boothroyd | May 6, 1947 |
| 2,423,396 | Linder | July 1, 1947 |
| 2,425 738 | Hansen | Aug. 19, 1947 |
| 2,474,794 | Van Beuren | June 28, 1949 |
| 2,476,034 | Fox | July 12, 1949 |
| 2,487,619 | Usselman | Nov. 8, 1949 |
| 2,489,131 | Hegbar | Nov. 22, 1949 |
| 2,514,544 | Hansen | July 11, 1950 |
| 2,538,771 | Feenberg | Jan. 23, 1951 |
| 2,557,110 | Jaynes | June 19, 1951 |